United States Patent [19]

McKinnon

[11] Patent Number: 5,193,859
[45] Date of Patent: Mar. 16, 1993

[54] REINFORCED PIPE COUPLING MEMBER

[76] Inventor: Robert M. McKinnon, P.O. Box 648, Bedford, Tex. 76021-0648

[21] Appl. No.: 696,187

[22] Filed: May 6, 1991

Related U.S. Application Data

[63] Continuation-in-part of Ser. No. 413,827, Sep. 28, 1989, abandoned.

[51] Int. Cl.[5] ............................................. F16L 21/00
[52] U.S. Cl. .................................... 285/417; 285/236
[58] Field of Search ............... 285/235, 236, 237, 423, 285/417; 128/172, 174

[56] References Cited

U.S. PATENT DOCUMENTS

| | | | |
|---|---|---|---|
| 1,628,302 | 5/1927 | Bray | 285/236 |
| 1,696,435 | 12/1928 | Fraley | 285/236 |
| 2,726,682 | 12/1955 | Conroy | 285/236 |
| 2,917,102 | 12/1959 | Mahady | 285/235 |
| 3,104,898 | 9/1963 | MacDonald | 285/236 |
| 3,107,931 | 10/1963 | Killian | 285/236 |
| 3,394,932 | 7/1968 | Garrett | 285/236 |
| 3,424,482 | 1/1969 | Ligon | 285/236 |
| 3,550,899 | 12/1970 | Clarkson | 285/236 |
| 3,630,550 | 12/1971 | Zine | 285/235 |
| 3,814,468 | 6/1974 | Mauramatsu | 285/235 |
| 3,860,043 | 1/1975 | Kutnyak et al. | 285/236 |
| 3,861,721 | 1/1975 | Berghöfer | 285/236 |
| 3,874,711 | 4/1975 | Scalzo et al. | 285/236 |
| 4,005,293 | 1/1977 | Sipler | 285/236 |
| 4,023,835 | 5/1977 | Ewing | 285/235 |
| 4,682,797 | 7/1987 | Hildner | 285/238 |
| 4,717,182 | 1/1988 | Behrens et al. | 285/235 |

FOREIGN PATENT DOCUMENTS

| | | | |
|---|---|---|---|
| 522902 | 12/1955 | Belgium | 285/236 |
| 935465 | 10/1973 | Canada | 285/236 |
| 981723 | 1/1976 | Canada | 285/236 |
| 2109566 | 9/1972 | Fed. Rep. of Germany | 285/236 |
| 2225130 | 12/1973 | Fed. Rep. of Germany | 285/236 |
| 8200379 | 9/1982 | Netherlands | 285/236 |
| 643644 | 6/1984 | Switzerland | 285/236 |
| 450181 | 7/1936 | United Kingdom | 285/237 |
| 776837 | 6/1957 | United Kingdom | 285/236 |
| 867346 | 5/1961 | United Kingdom | 285/236 |
| 2078892 | 1/1982 | United Kingdom | 411/903 |

Primary Examiner—Eric K. Nicholson
Attorney, Agent, or Firm—Arthur F. Zobal

[57] ABSTRACT

A pipe coupling member for coupling together the ends of two pipes has a sleeve portion and a band member. The sleeve portion has an opening that extends between first and second ends. The band member is band shaped and is lcoated or embedded with the wall of the sleeve portion so as to be concentric therewith. The sleeve portion is made of a flexible elastomeric material and the band member is made of either fiber glass or polycarbonate plastic to provide reinforcement. The band member is stiff, yet resilient. The band member is confined to a central portion of the sleeve portion so that the first and second ends are flexible. The coupling member is manufactured using an annular mold. In the production process, the band member is supported and located within the central portion of the mold annulus by plural pins extending from the mold ends in a longitudinal direction. The annulus is then filled with elastomeric material. After molding, the pins are pulled out of the coupling member.

20 Claims, 2 Drawing Sheets

U.S. Patent     Mar. 16, 1993     Sheet 1 of 2     5,193,859
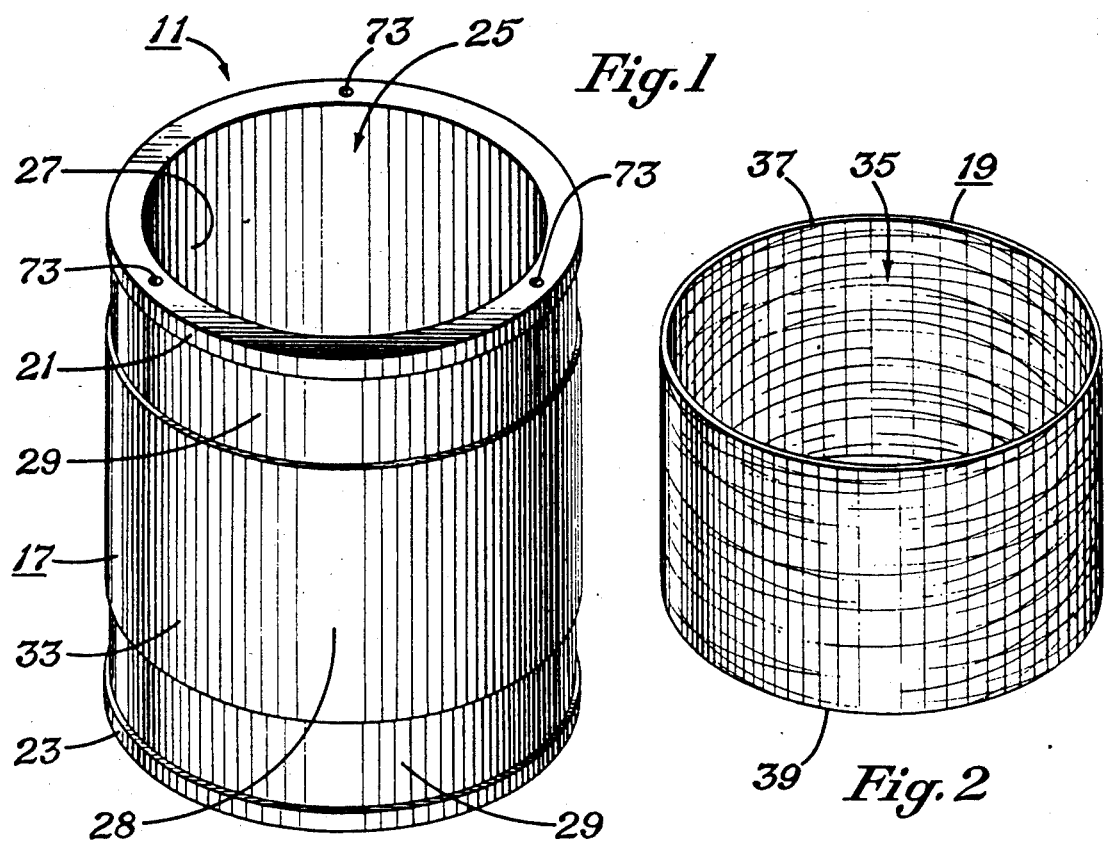
*Fig.1*
*Fig.2*
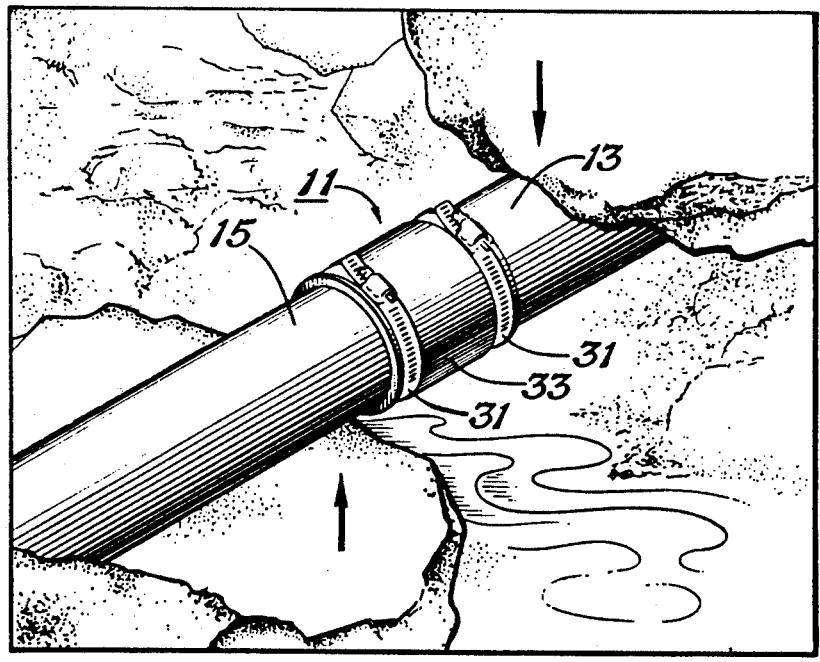
*Fig.3*

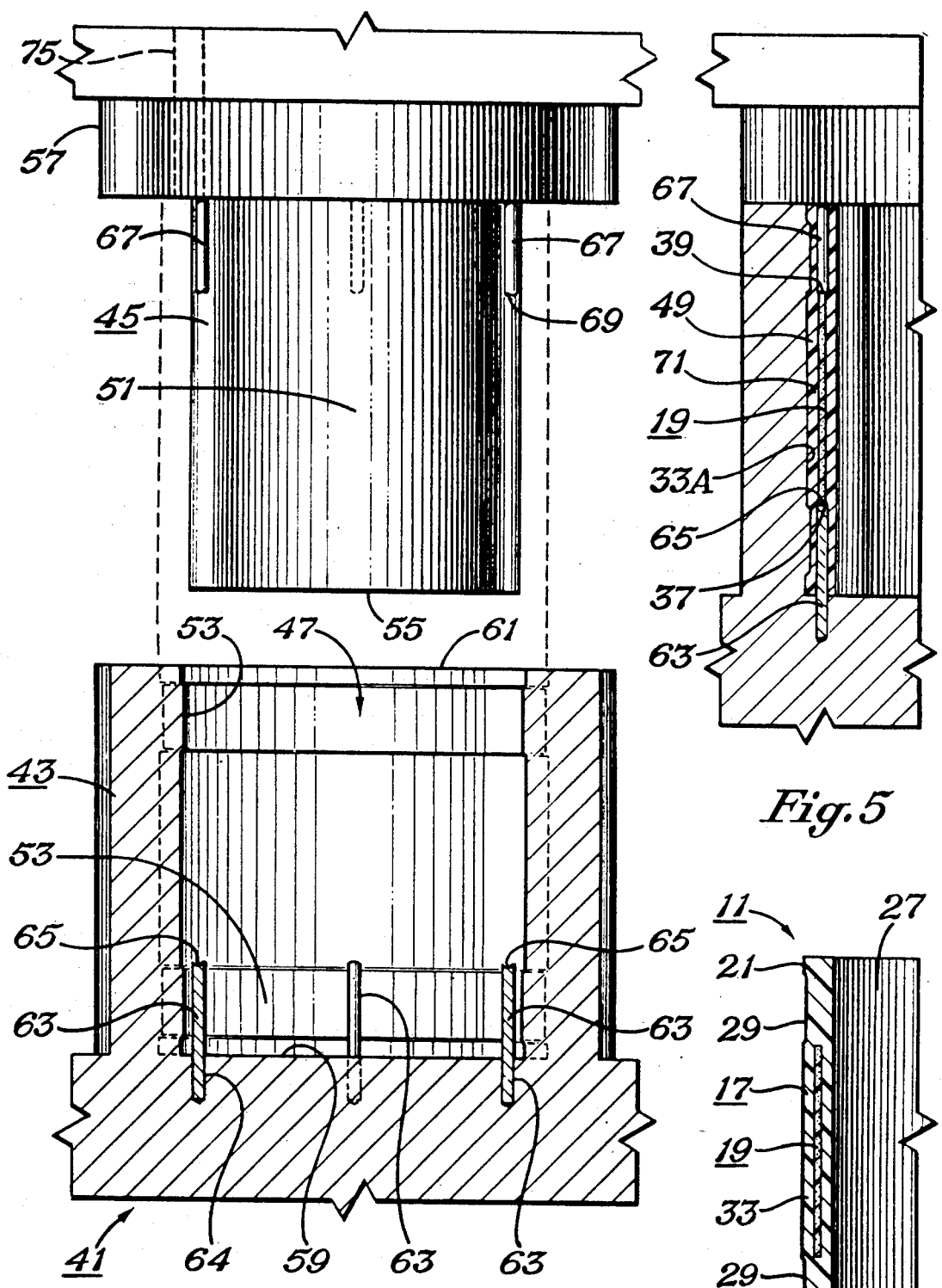

REINFORCED PIPE COUPLING MEMBER

This application is a continuation-in-part of U.S. patent application Ser. No. 07/413,827, filed on Sep. 28, 1989 now abandoned.

FIELD OF THE INVENTION

The present invention relates to pipe couplings for sealingly coupling the ends of two pipes together and to the methods of their manufacture.

BACKGROUND OF THE INVENTION

Pipe couplings are used to couple or join the ends of two lengths of pipe together. Pipe couplings are basically sleeve-like devices, having a cylindrical passage therethrough for receiving the two pipes. In addition to coupling the ends of the pipes together, a pipe coupling provides seals around each pipe end for preventing leakage from the joint.

A typical application of pipe couplings occurs when a damaged section of pipe is replaced. A new pipe section is inserted in place of the old damaged section. Pipe couplings are used on each end of the new section of pipe to couple the section to the free ends of the in situ pipe.

In the prior art, flexible pipe couplings have been used to couple pipes together. Flexible pipe couplings typically have sealing surfaces integral therein, simplifying both manufacturing and installation. In addition, flexible pipe couplings flex with pipe movement to maintain the integrity of the seals around the pipes. Such pipe movement occurs when the surrounding earth moves. Occasionally pipe movement can be such that shear forces are produced across the pipe joint. Therefore, it is desirable to have a pipe coupling that will withstand such shearing forces.

In addition, it is desirable to use one type of pipe coupling for both sewer pipes and high pressure water pipes. In contrast to high pressure water pipes, sewer pipes are typically low pressure applications. The pipe coupling should be reinforced to prevent harmful bulging of the pipe coupling due to the high water pressure exerted by high pressure water pipes. Furthermore, should the pipe coupling be deformed, the reinforced pipe coupling should be able to regain its original shape after the deforming force is removed.

SUMMARY OF THE INVENTION

It is an object of the present invention to provide a pipe coupling member for use in coupling together the ends of a pipe, which coupling member will resist shearing movement of the coupled pipes.

It is a further object of the present invention to provide a pipe coupling member that can be used on both low pressure and high pressure pipe applications.

Still another object of the present invention is to provide a pipe coupling member that can regain its original shape after having been deformed.

The coupling member of the present invention includes a hollow cylindrically shaped wall means and a band member. The wall means has first and second end portions and a cylindrical opening formed therethrough between the first and second end portions. The opening is adapted for receiving the respective ends of two pipes. The wall means has an inner surface for contacting the outside diameters of the pipes. The first and second end portions are adapted to receive means for retaining the coupling member onto the pipe end portions. The wall means has a central portion that is located between the first and second end portions. The wall means is made of an elastomeric material so as to flexible. The band member includes a hollow cylindrically shaped band with a passage extending therethrough between two ends. The band member is embedded within the wall means central portion and is spaced inwardly from said first and second end portions. The band member is confined to the central portion of the wall means such that the first and second end portions of the wall means retain their flexibility. The band member is made of a material that is stiffer than the elastomeric material so as to resist deformation. The band member material is resilient so that if the band member is deformed by a force, the band member will regain its cylindrical shape when the deforming force is removed.

In one aspect, the band member is made of either fiber glass or polycarbonate plastic. The band member is stiff so as to resist shear forces and outward bubbling of the coupling member caused by high internal pressures such as are encountered on high pressure water pipe applications. The band member is also resilient so that if the band member is deformed by a force, the band member will regain its cylindrical shape when the deforming force is removed.

In still another aspect, the first and second end portions have respective circumferential channels for receiving the retaining means.

There is also provided a method of making a coupling member which includes the steps of providing an annular mold which has an outer portion and an inner core portion for molding the coupling member. The mold has an annulus between the outer and inner portions, which annulus forms a hollow cylindrically shaped wall means of the coupling member. The mold has first and second ends that correspond to first and second ends of the molded coupling member. Plural pins are inserted into one end of the mold, with the pins protruding into the annulus of the mold. A reinforcing band member is placed in the annulus and onto the pins. The band member is annular having two ends. The annulus is filled with fluidized elastomeric material, whereby the pins retain the band member in position in the annulus while the coupling member is being molded. The coupling member is then removed from the mold after the elastomeric material has solidified and the pins are removed from the coupling member.

In one aspect of the method of manufacture, there are provided at least three pins in one end of the mold. The pins are notched in their free ends for better retaining the band member. In still another aspect, there are provided a second set of pins on the other end of the mold to firmly retain the band member between the first and second set of pins.

BRIEF DESCRIPTION OF THE DRAWINGS

FIG. 1 is an isometric view of the coupling member of the present invention, in accordance with a preferred embodiment.

FIG. 2 is an isometric view of the band member.

FIG. 3 is an isometric view of the coupling member installed on a pipeline.

FIG. 4 is a schematic exploded cross-sectional side view of a mold for use in manufacturing the coupling member.

FIG. 5 is a schematic cross-sectional view of the mold, shown with the coupling member molded therein.

FIG. 6 is a longitudinal cross-sectional view of a portion of the coupling member.

DESCRIPTION OF PREFERRED EMBODIMENT

In FIG. 1, there is shown an isometric view of the coupling member 11 of the present invention, in accordance with a preferred embodiment. The coupling member 11 is used to provide a leak-proof coupling between the ends of two lengths of pipe 13, 15, as shown in FIG. 3. The coupling member 11 is flexible at its ends to provide integral sealing surfaces, and is reinforced in its center portion spaced inwardly from its ends to provide stiffness for mechanical strength. The reinforcement is also resilient to return the coupling member to its original cylindrical shape should deformation occur.

Referring to FIGS. 1, 2, and 6, the coupling member 11 includes a sleeve portion 17 and a band member 19.

The sleeve portion 17 is made up of a hollow cylindrically shaped wall that has first and second end portions 21, 23. The sleeve portion 17 has a cylindrical interior passage 25 extending between the first and second ends 21, 23. The passage 25 forms a smooth inner surface 27 which is adapted to sealingly engage the outside diameters of end portions of the pipes 13, 15. The first and second end portions 21, 23 each have a circumferential channel 29 for receiving a band clamp 31 (see FIG. 3) for retaining the coupling member 11 to the end portions of the pipes 13, 15. Between the two channels 29 is a central portion 33.

The sleeve portion 17 is made of an elastomeric material. In the preferred embodiment, the sleeve portion 17 is made of flexible polyvinylchloride (PVC) such as type II, or plasticized, PVC. A typical plasticizer that may be used is dioctylphthalate. In addition, the sleeve portion can be made of either flexible polyurethane or natural rubber. An example of flexible polyurethane are the polyurethane diisocyanate elastomers, which are commonly referred to as urethane rubber. These elastomers are made with various isocyanates, such as tolylene diisocyanate, 4,4'-diphenylmethane diisocyanate, or 1,5 naphthalene diisocyanate.

The band member 19 is made up of a hollow cylindrically shaped wall. The band member has first and second ends 37, 39. The band shaped band member has an interior passage 35 therethrough. In the preferred embodiment, the band member 19 is embedded and located inside of the central portion 33 of the sleeve portion 17 so as to be spaced inwardly from the ends 21 and 23 as shown in FIG. 6. The longitudinal length of the band member 19 is about the same as the longitudinal length of the central portion 3 of the sleeve portion. The band member 19 is located inside of the sleeve portion wall and embedded therein such that the band member is confined to the central portion. This configuration preserves the flexibility of the first and second end portions 21, 23.

The band member 19 is made of a material that is both stiffer than the elastomeric material, to resist deformation, and resilient so as to regain its original shape if deformed. In the preferred embodiment, the band member is made of either fiber glass or polycarbonate plastic. A fiber glass band member is fabricated with a single end roving of a glass strand wound onto a mandrel to produce a fiber glass pipe about 20 feet in length and of the appropriate diameter. The glass strand is a continuous filament. The angle with which the glass roving is wound relative to the longitudinal axis of the fiber glass pipe depends on strength considerations in the longitudinal and circumferential directions. The closer to 90 degrees the angle of roving is the greater the circumferential strength will be, but at the expense of the longitudinal strength. Decreasing the angle towards the longitudinal axis of the fiber glass pipe (or the band member) will increase its strength in the longitudinal direction, but decrease its strength in the circumferential direction. A polyester resin or an epoxy resin and a curing agent is applied to the glass roving for binding. In the preferred embodiment, the glass strand is C501 STAR ROV single end roving available from Manville, the epoxy resin is EPON Resin 826 (a low viscosity, light colored liquid bisphenolA/Epichlorhydrin based epoxy resin) available from Shell Chemical Company, and the curing agent is LINDRIDE 66K (a blend of anhydride containing methylhexahydrophthalic anhydride (MHHPA)), available from Lindau Chemicals, Inc. The curing agent LINDRIDE 66K is preppromoted with a quaternary amine. The curing agent is used with the resin at 86 parts hardener to 100 parts resin. The glass roving has a yield of 450 yards per pound and a filament diameter of "P". The glass roving is wound onto the mandrel 24 at about a 75 degree angle from the longitudinal axis. The fiber glass tube is cut into the appropriate lengths to form the band members 19. A fiber glass band member has been successfully tested to 3000 psi of deforming pressure applied radially inward relative to the axis of the band member, wherein after the pressure was removed the band member popped back into its original shape. A band member 19 made of polycarbonate plastic is fabricated by molding it in an annular mold. The band member contains 80% polycarbonate plastic (which L is commercially available as LEXAN plastic) and 20% glass strand fibers (the same type of fibers used to make fiber glass products). The fibers and the polycarbonate plastic are blended together before being used in the mold.

The installation and use of the coupling member 11 will now be described with reference to FIGS. 1 and 3. The first and second pipes 13, 15 are aligned as shown, so that their respective ends which are to be coupled are close to each other. An appropriate sized coupling member is chosen for the pipe, such that the inside diameter of the coupling member is slightly larger than the outside diameter of the pipe. Then, the end of the first pipe 13 is inserted about halfway into the passage 25 via the first end portion 21 of the coupling member 11. The end of the second pipe 15 is next inserted about halfway into the passage via the second end portion 23 of the coupling member 11. Band clamps 31 are located within the channels 29 such that there is a band clamp by each of the first and second end portions of the coupling member. The band clamps 31 are then tightened to provide a seal around each pipe. With the band clamps tightened, the inner surface 27 at the first and second end portions is forced into sealing engagement with the outside diameter of the first and second pipes 13, 15, thereby providing a seal around the complete circumference of each pipe. As shown in FIG. 6, the band member 19 is located in the central portion 33 of the sleeve portion 17, so that while the band member 19 provides stiffness to the central portion 33 of the sleeve portion, the first and second end portions 21, 23 (which include the band clamp channels 29) are flexible. Thus, the rigidity of the band member does not interfere with the sealing function of the first and second end portions 21, 23.

The band member 19 is made of a material that is stiffer than the elastomeric material of the sleeve portion. Such stiffness reinforces the flexible sleeve portion 17 to provide structural strength. The band member resists deformation of the coupling member such as might be caused by shearing, high water pressure inside of the coupled pipes, or where a piece of heavy machinery or a heavy truck overlays a buried pipeline joint. In FIG. 3, there is shown an example of shear forces, wherein a first pipe 13 is coupled to a second pipe 15 by the coupling member 11 in the present invention. The first pipe 13 is subjected to a downward force, while the second pipe 15 is subjected to an upward force. These opposite forces produce a shearing force across the coupling member. The band member 19 resists deformation of the coupling member 11 thereby maintaining the mechanical coupling between the two pipes and the leak-proof seals around the coupling. The band member 19 also resists deformation of the coupling member 11 when the coupling member is subjected to high water pressure inside of the pipeline. An unreinforced coupling member would tend to bulge outwardly due to the high water pressure. However, with the band member, any outward bulging is eliminated. The band member 19 also resists deformation of the coupling member 11 when a piece of heavy machinery or a heavy truck overlays a buried pipeline joint.

The band member 19 is also resilient, having a "memory", so that if the coupling member is deformed radially inward relative to its axis, it will regain its original shape when the deforming force is removed. Thus, the stiff, yet resilient, band member maintains the structural integrity of the elastomeric coupling member, in order to provide a strong mechanical coupling of the two pipes and maintain seal integrity.

The method of manufacturing the coupling member 11 will now be describe with reference to FIGS. 4–6. The coupling member is molded within either an injection mold or a pour mold 41. The mold has an outer portion 43 and an inner core portion 45. The inner core portion 45 fits within a cavity 47 of the outer portion to form a cylindrical annular space 49 therebetween. The inner core portion 45 has a smooth cylindrical surface 51 for forming the inner surface 27 of the coupling member 11. The outer portion 43 of the mold has projections 53 for forming the channels 29 of the coupling member 11. The inner core portion 45 has a first end 55 and a second flanged end 57. The outer portion cavity 47 has first and second ends 59, 61. When the inner and outer portions 43, 45 are fitted together for molding, the inner portion first end 55 contacts the outer portion cavity first end 59 and the outer portion second end 61 contacts the inner portion second end 57.

The outer portion 43 of the mold has, located within the cavity at the first end 59, a plurality of pins 63 for supporting and positioning the band member 19 within the annulus 49. The pins 63 project in a longitudinal direction, toward the second end 61 of the outer portion. In the preferred embodiment, there are three pins 63, spaced 120 degrees apart around the annulus. The pins 63 are supported in apertures 64 formed in the end 59 of the outer mold portion 43. The free end of each pin 63 has a notch 65 that is aligned tangentially to the annulus, so as to support more firmly the end of the band member 19. The flanged second end 57 of the inner portion 45 also has plural pins 67 projecting a longitudinal direction towards the first end 55 of the inner portion. The inner portion pins are spaced 120 degrees apart and are notched 69 in the free ends. The length of the pins 63, 67 is such that when the mold 41 is assembled, the band member 19 is supported firmly with the pins 63 contacting the first end 37 of the band member and the pins 65 contacting the second end 39 of the band member such that the band member 19 is located within the central portion 33A of the annulus 49 (and the central portion 33 of the molded coupling member). The band member 19 is also positioned in the center of the annulus, so as to be centered between the inner and outer surfaces 27, 28 of the coupling member.

To manufacture a coupling member 11, the inner and outer mold portions 43, 45 are separated and a band member 19 is placed in the notches 65 of the pins 63. Then, the inner portion 45 is placed inside of the outer portion cavity 47 as shown in FIG. 5. Conventional molding techniques such as stair stepping are used to center the inner portion 45 relative to the outer portion cavity 47. The pins 67 contact the band member to firmly retain the band member in place inside of the annulus 49. Then, the annulus 49 is filled with fluidized elastomeric material 71 by way of an inlet 75 formed through the flanged end 57. In injection molding, the elastomeric material is injected under high pressure. The band member 19 is firmly retained in place by the pins 63, 67. In pour molding, the elastomeric material is poured into the annulus. With pour molding, the pins 67 can be eliminated; the band member being kept on the pins 63 by gravity.

When the elastomeric material has set, the inner portion 45 is pulled out of the cavity 47. The pins 67 are pulled out of the coupling member 11. Then, the coupling member 11 is removed from the outer portion 43 (the outer portion can be made into two halves to allow separation for ease of removal) and the pins 63 are removed from the coupling member. Small openings 73 are formed in the end portions of the coupling member by the removal of the pins 63, 67.

By molding the coupling member in accordance with the method described herein, the band member 19 is located within the central portion 33 of the elastomeric wall where the band member is prevented from stiffening the first and second end portions. Thus, the first and second end portions 21, 23 retain their flexibility for sealing around the pipes. Furthermore, by using pins to position the band member within the mold, the size of the openings 73 formed by the positioning pins is minimized. The small openings 73 have an inconsequential effect on the ability to obtain a seal around the coupling member end portions 21, 23.

An example of the dimensions of a typical coupling member is as follows: for a coupling member to be used on a 3 inch outside diameter pipeline, the length of the sleeve portion 17 is 4.1 inches, the inside diameter of the passage 25 is 3.048 inches, and the outside diameter of the coupling member is 4.075 inches; the band member has a length of 2.120 inches, an inside diameter of 3.690 inches, and an outside diameter of 3.850 inches. The coupling member of the present invention can be made to fit 15 inch outside diameter pipes and larger.

The coupling member of the present invention can be used on various types of pipe including cast iron, steel, Schedule 40 plastic pipe, 35 pipe, and clay. In addition, the coupling member can be used on sewer pipes (where relatively low pressures are encountered), as well as high pressure water pipe, thereby eliminating the need for two types of coupling members for two types of pipes. Thus, the coupling member of the present invention reduces inventory requirements.

Although the coupling member of the present invention has been described as a straight sleeve for coupling pipes of equal diameters, the coupling member of the present invention can be made in eccentric or concentric configurations to couple a large diameter pipe to a smaller diameter pipe.

The foregoing disclosure and the showings made in the drawings are merely illustrative of the principles of this invention and are not to be interpreted in a limiting sense.

I claim:

1. A coupling member for coupling together the ends of two pipes, comprising:
   a) a hollow cylindrically shaped wall means having an outer surface, first and second ends, and
   b) said wall means having an inner surface for contacting the outside surfaces of said pipes;
   c) said wall means being made of an elastomeric material so as to be flexible;
   d) a hollow cylindrically shaped band member with a passage extending therethrough between two ends, said band member having inner and outer surfaces and being embedded in said wall means between said first and second ends such that said wall means completely covers said inner and outer surfaces of said band member, said band member being concentric with said wall means;
   e) said band member being made of a material selected from the group consisting of fiber glass and polycarbonate plastic blended with glass roving fibers;
   f) said wall means having a first end portion located between one of said ends of said band member and said first end of said wall means and a second end portion located between the other of said ends of said band member and said second end of said wall means,
   g) said outer surfaces of said first and second end portions of said wall means being adapted to receive first and second retaining means for retaining said coupling means to said pipe end portions.

2. The coupling member of claim 1 wherein: said band member is located and completely embedded within said wall means;
   said outer surfaces of said first and second end portions have first and second circumferential channels respectively for receiving said first and second retaining means for retaining said coupling member onto said pipe end portions.

3. The coupling member of claim 2 wherein said inner surface of said wall means is smooth.

4. A coupling member for coupling together the ends of two pipes, comprising:
   a) a hollow cylindrically shaped wall means having first and second end portions with first and second ends respectively, and, said opening being adapted for receiving the respective ends of two pipes;
   b) said wall means having an inner surface for contacting the outside surfaces of said pipes, said first and second end portions being adapted to receive first and second retaining means respectively for retaining said coupling member onto said pipe end portions;
   c) said wall means having a central portion located between said first and second end portions;
   d) said wall means being made of an elastomeric material so as to be flexible;
   e) a hollow cylindrically shaped band member with a passage extending therethrough between two ends, said band member being located and completely embedded within said wall means central portion, said band member being confined to said central portion of said wall means such that said first and second end portions retain their flexibility;
   f) said band member being made of a non-metallic material that is different from said elastomeric material and stiffer than said elastomeric material so as to resist deformation, and said band member material being resilient,
   g) said wall means in at least one of said end portions has a plurality of longitudinal bores that extend from said end of said one end portion to the closest end of said band member.

5. The coupling member of claim 1 wherein:
   said hollow cylindrically shaped wall means has an outer surface and an axis,
   in a plane transverse to the axis of said hollow cylindrically shaped wall means, said outer and inner surfaces are continuous for 360 degrees,
   said band member comprises a single member which has an axis,
   in a plane transverse to the axis of said band member, said band member is continuous for 360 degrees.

6. The coupling member of claim 3, wherein:
   said hollow cylindrically shaped wall means has an outer surface and an axis,
   in a plane transverse to the axis of said hollow cylindrically shaped wall means, said outer and inner surfaces are continuous for 360 degrees,
   said band member comprises a single member which has an axis,
   in a plane transverse to the axis of said band member, said band member is continuous for 360 degrees.

7. The coupling member of claim 4, wherein:
   said hollow cylindrically shaped wall means has an outer surface and an axis,
   in a plane transverse to the axis of said hollow cylindrically shaped wall means, said outer and inner surfaces are continuous for 360 degrees,
   said band member comprises a single member which has an axis,
   in a plane transverse to the axis of said band member, said band member is continuous for 360 degrees.

8. A coupling member for coupling together the ends of two pipes, comprising:
   a) a hollow cylindrically shaped wall means having first and second end portions with first and second ends respectively, and an opening formed therethrough between said first and second ends, said opening being adapted for receiving the respective ends of two pipes;
   b) said wall means having an inner surface for contacting the outside surfaces of said pipes, said first and second end portions being adapted to receive means for retaining said coupling member onto said pipe end portions;
   c) said wall means being made of an elastomeric material so as to be flexible;
   d) a hollow cylindrically shaped band member with a passage extending therethrough between two ends, said band member being embedded in said wall means between said first and second ends, said band member being concentric with said wall means;

e) said band member being made of a material selected from the group consisting of fiber glass and polycarbonate plastic blended with glass roving fibers;

f) said wall means in at least one of said end portions having a plurality of longitudinal bores that extend from said end of said one end portion to the closest end of said band member.

9. A coupling member for coupling together the ends of two pipes, comprising:

a) a hollow cylindrically shaped wall means having first and second end portions with first and second ends respectively, and, said opening being adapted for receiving the respective ends of two pipes;

b) said wall means having an inner surface for contacting the outside surfaces of said pipes, said first and second end portions being adapted to receive means for retaining said coupling member onto said pipe end portions;

c) said wall means having a central portion located between said first and second end portions;

d) said wall means being made of an elastomeric material so as to be flexible;

e) a hollow cylindrically shaped band member with a passage extending therethrough between two ends, said band member being located within said wall means central portion, said band member being confined to said central portion of said wall means such that said first and second end portions retain their flexibility;

f) said band member being made of a non-metallic material that is different from said elastomeric material and stiffer than said elastomeric material so as to resist deformation, and said band member material being resilient, g) said wall means in at least one of said end portions having a plurality of longitudinal bores that extend from said end of said one end portion to the closest end of said band member.

10. A coupling member for coupling together the ends of two pipes, comprising:

a) a hollow cylindrically shaped wall means having an outer surface, first and second ends, and an opening formed therethrough between said first and second ends, said opening being adapted for receiving the respective ends of two pipes;

b) said wall means having an inner surface for contacting the outside surfaces of said pipes;

c) said wall means having a central portion located between said first and second ends;

d) said wall means being made of an elastomeric material so as to be flexible;

e) a hollow cylindrically shaped band member with a passage extending therethrough between two ends, said band member having inner and outer surfaces and being embedded within said wall means such that said wall means completely covers said inner and outer surfaces of said band member;

f) said band member being made of a non-metallic material that is different from said elastomeric material and stiffer than said elastomeric material so as to resist deformation, and said band member material being resilient, g) said wall means having a first end portion located between one of said ends of said band member and said first end of said wall means and a second end portion located between the other of said ends of said band member and said second end of said wall means, said band member being embedded in an intermediate portion of said wall means between said first and second end portions, said outer surfaces of said first and second end portions of said wall means being adapted to receive first and second retaining means for retaining said coupling means to said pipe end portions, in a plane transverse to the axis of said hollow cylindrically shaped wall means, said outer and inner surfaces are continuous for 360 degrees;

said inner surface of said wall means along the length of said intermediate portion has the same diameter;

said band member comprises a single member;

in a plane transverse to the axis of said band member, said band member is continuous for 360 degrees.

11. The coupling member of claim 10, wherein:
said band member is made of a material selected from the group consisting of fiberglass and polycarbonate plastic blended with glass roving fibers.

12. The coupling member of claim 1, wherein:
said band member is molded within said wall means.

13. The coupling member of claim 12, wherein:
said band member is molded within said wall means such that said band member is located and completely embedded within said wall means.

14. The coupling member of claim 1, wherein:
said band member comprises a single member having an inside surface and an outside surface such that said inside surface of said band member along its length between said two ends has the same inside diameter and said outside surface of said band member along its length between said two ends has the same diameter.

15. The coupling member of claim 1, wherein:
said wall means has a central portion located between and spaced from said first and second ends, said band member being located at said central portion, said band member being of a length that is shorter than the length of said wall means as measured between said first and second ends such that said band member is confined to said central portion.

16. The coupling member of claim 15, wherein:
said inner surface of said central portion of said hollow cylindrically shaped wall means is cylindrical in shape such that said inner surface of said wall means along the length of said central portion has the same diameter.

17. The coupling member of claim 16, wherein:
said band member is completely embedded within said wall means.

18. The coupling member of claim 17, wherein:
said band member is resilient such that if said coupling member is deformed by a force applied radially with respect to its axis, said coupling member will regain its original shape when the force is removed.

19. The coupling member of claim 1, wherein:
said wall means in at least one of said end portions has a plurality of longitudinal bores that extend from said end of said one end portion to the closest end of said band member.

20. The coupling member of claim 10, wherein:
said wall means in at least one of said end portions has a plurality of longitudinal bores that extend from said end of said one end portion to the closest end of said band member.

* * * * *